United States Patent
Harper et al.

(10) Patent No.: US 7,526,400 B2
(45) Date of Patent: Apr. 28, 2009

(54) THERMAL MODELING AND ERROR DETECTION IN A DATA PROCESSING CONFIGURATION

(75) Inventors: Richard Edwin Harper, Chapel Hill, NC (US); William Joseph Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 11/129,934

(22) Filed: May 16, 2005

(65) Prior Publication Data

US 2006/0231639 A1 Oct. 19, 2006

Related U.S. Application Data

(60) Provisional application No. 60/671,369, filed on Apr. 14, 2005.

(51) Int. Cl.
G01K 17/00 (2006.01)
G06F 11/30 (2006.01)

(52) U.S. Cl. ......... 702/136; 702/182; 702/185; 702/193; 700/278; 714/27

(58) Field of Classification Search ......... 702/182–193, 702/130–136; 700/105, 278, 299; 375/220; 374/1, 141; 324/765; 361/106; 714/37
See application file for complete search history.

(56) References Cited

U.S. PATENT DOCUMENTS

| 5,255,149 A | 10/1993 | Matsuo |
|---|---|---|
| 5,586,156 A | 12/1996 | Gaubatz |
| 6,098,030 A | 8/2000 | McMinn |
| 6,415,276 B1 | 7/2002 | Heger et al. |
| 6,502,042 B1 | 12/2002 | Eid et al. |
| 6,594,620 B1 | 7/2003 | Qin et al. |
| 6,606,580 B1 | 8/2003 | Zedda et al. |
| 2002/0037031 A1* | 3/2002 | Agazzi et al. ........... 375/220 |
| 2003/0028345 A1 | 2/2003 | Watkins et al. |
| 2003/0065483 A1 | 4/2003 | Ting et al. |
| 2003/0088381 A1 | 5/2003 | Henry et al. |
| 2003/0177165 A1* | 9/2003 | Bradley et al. ........... 709/105 |
| 2004/0030417 A1 | 2/2004 | Gribble et al. |
| 2004/0061481 A1 | 4/2004 | Heinrich et al. |

* cited by examiner

Primary Examiner—Eliseo Ramos Feliciano
Assistant Examiner—Phuong Huynh
(74) Attorney, Agent, or Firm—John Biggers; Cynthia Seal; Biggers & Ohanian LLP.

(57) ABSTRACT

A method of operating a data processing system includes predicting values for a set of thermal sensors based on an assumed inlet air temperature and a selected configuration state. Additional values are predicted for a plurality of assumed inlet air temperatures and a plurality of configuration states. Actual thermal sensor values are then determined. A measure of the difference between each set of predicted values and the set of actual values is determined and, based thereon, a most likely configuration state is identified. The plurality of thermal sensors preferably includes an inlet air thermal sensor suitable for determining air temperature at an inlet to the system. The configuration states includes a state in which one of the thermal sensors is malfunctioning. The measure of difference is determined by squaring a difference between each actual thermal sensor values and a corresponding predicted thermal sensor value and summing the squares.

17 Claims, 5 Drawing Sheets

FIG. 5

| CONFIG STATE / FAIL SCENARIO | FIGURE OF MERIT FOR ASSUMED INLET AIR TEMP OF: | | | | |
|---|---|---|---|---|---|
| | 21 C | 23 C | . . . | 37 C | |
| NOMINAL OPERATION | 31 | 27 | . . . | 51 | ~501-1 |
| INTAKE 1 BLOCKED | 76 | 82 | . . . | 126 | ~501-2 |
| INTAKE 2 BLOCKED | 55 | 58 | . . . | 78 | |
| . . . | | . | | . | |
| EXHAUST BLOCKED | 33 | 37 | . . . | 99 | |
| COVER PANEL 1 MISSING | 19 | 17 | . . . | 39 | |
| COVER PANEL 2 MISSING | 15 | 12 | . . . | 4 | |
| . . . | | . | | . | |
| SUBSYSTEM 1 OVERHEATING | 31 | 26 | . . . | 73 | |
| SUBSYSTEM 2 OVERHEATING | 49 | 43 | . . . | 84 | |
| . . . | | . | | . | |
| INLET SENSOR READS 2 C HIGH | 13 | 9 | . . . | 31 | |
| INLET SENSOR READS 4 C HIGH | 13 | 11 | . . . | 29 | |
| . . . | | . | | . | |
| $T_1$ SENSOR READS 2 C HIGH | 27 | 26 | . . . | 67 | ~501-K |
| $T_1$ SENSOR READS 4 C HIGH | 31 | 29 | . . . | 81 | ~501-N |

502-1  502-2            502-M

500

THERMAL MODELING AND ERROR DETECTION IN A DATA PROCESSING CONFIGURATION

This application claims priority from provisional application No. 60/671,369 filed 14 Apr. 2005, which is incorporated in its entirety herein.

RELATED PATENT APPLICATION

The subject matter disclosed herein is related to the subject matter disclosed in U.S. patent application Ser. No. 10/610,303, entitled Thermal Analysis in a Data Processing System, filed Jun. 30, 2003 (hereinafter referred to as the "Thermal Analysis Application"), which shares a common assignee with the present application and is incorporated by reference herein in its entirety.

BACKGROUND

1. Field of the Present Invention

The present invention is in the field of data processing systems and more specifically, thermal analysis of data processing systems.

2. History of Related Art

Thermal management is an increasingly important consideration in the design and implementation of data processing systems. This is especially true for compact or dense server arrangements such as blade servers and blade centers. A blade server (see, e.g., IBM eServer BladeCenter) is a type of rack-optimized server. Blade server designs range from ultra-dense, low-voltage, lesser-performing servers to high-performance, lower density servers to proprietary, customized rack solutions that include some blade features. A blade center refers to an enclosure that can hold a number of hot-swappable blade servers.

The Thermal Analysis Application cited above addresses a system and method of thermal monitoring with particular emphasis on blade server and blade center implementations. The thermal modeling disclosed in the Thermal Analysis Application is suitable for selecting a configuration state that most nearly matches a thermal configuration state reported by a set of thermal sensors. The thermal modeling Thermal Analysis Application assumed that information provided by thermal sensors is accurate and reliable. This assumption may not be appropriate in every application and environment. If a thermal sensor malfunctions and the data it reports is not accurate, a thermal model that assumes accurate data might indicate an erroneous configuration state. Accordingly, it would be desirable to implement a thermal modeling application for a data processing system that encompassed the possibility of a malfunctioning thermal sensor into its analysis.

SUMMARY OF THE INVENTION

The present invention addresses the identified objective with a method of operating a data processing system that includes predicting values for a set of thermal sensors based on an assumed inlet air temperature and a selected configuration state. Additional values are predicted for a plurality of assumed inlet air temperatures and a plurality of configuration states. Actual thermal sensor values are then determined. A measure of the difference between each set of predicted values and the set of actual values is determined and, based thereon, a most likely configuration state is identified. The plurality of thermal sensors preferably includes an inlet air thermal sensor suitable for determining air temperature at an inlet to the system. The configuration states includes a state in which one of the thermal sensors is malfunctioning. The measure of difference is determined by squaring a difference between each actual thermal sensor values and a corresponding predicted thermal sensor value and summing the squares.

BRIEF DESCRIPTION OF THE DRAWINGS

Other objects and advantages of the invention will become apparent upon reading the following detailed description and upon reference to the accompanying drawings in which:

FIG. 5 is a conceptual representation of a table of figure of merit values corresponding to the system of FIG. 4.

While the invention is susceptible to various modifications and alternative forms, the drawings show specific embodiments thereof by way of example that will be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Figure 1:
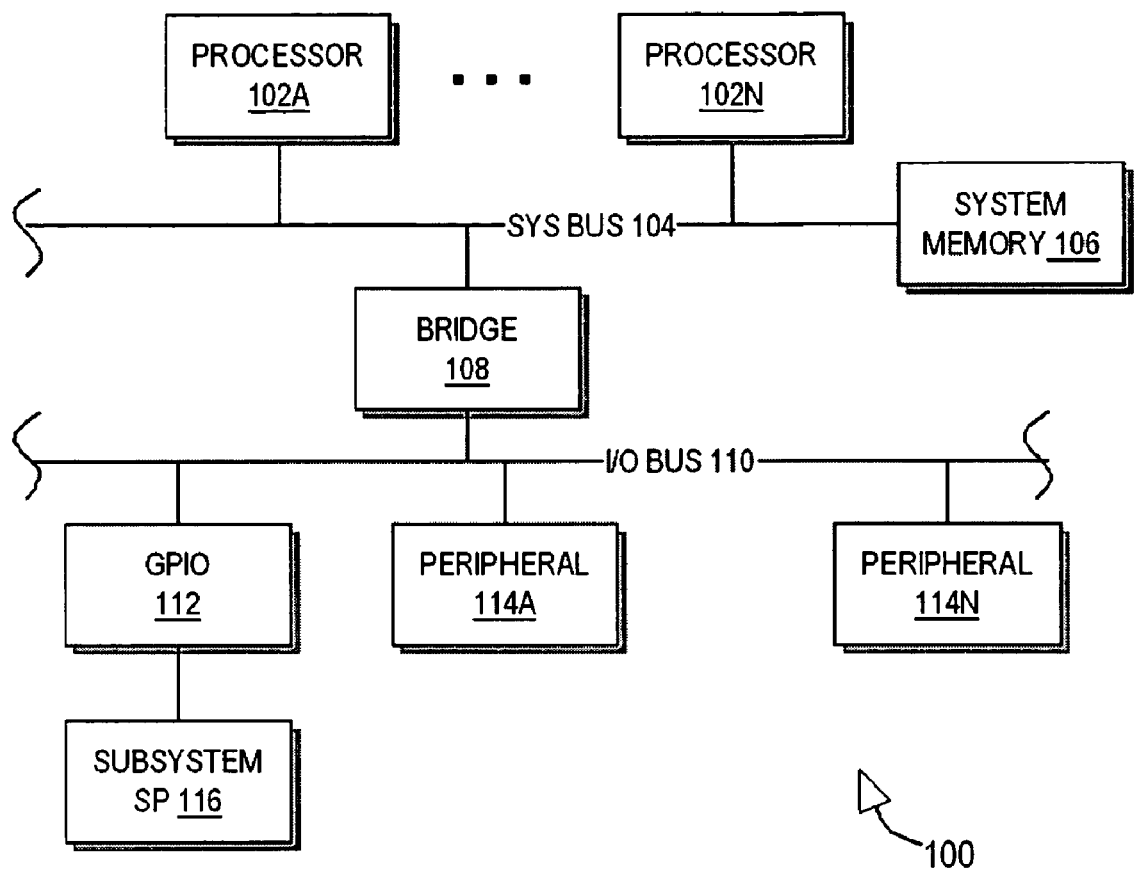
FIG. 1 is a block diagram of selected elements of a server blade for a data processing system according to an embodiment of the present invention.

Before describing the thermal modeling facilities of the present invention, selected elements of a data processing system suitable for use in the present invention are described. Turning to the drawings, FIG. 1 illustrates selected features of a data processing system 100 suitable for use with thermal modeling and detection abilities of the present invention. Data processing system 100 may be implemented entirely upon a single printed circuit board or "blade." In such and embodiment, data processing system 100 may be referred to herein as server blade 100. In the depicted embodiment, server blade 100 includes a set of main processors 102A through 102N (generically or collectively referred to as processor(s) 102) that are connected to a system bus 104. A common system memory 106 is accessible to each processor 102 via system bus 104. The system memory is typically implemented with a volatile storage medium such as an array of dynamic random access memory (DRAM) devices. The depicted architecture of server blade 100 is frequently referred to as a symmetric multiprocessor (SMP) system because each processor 102 has substantially equal access to system memory 106.

In server blade 100, a bus bridge 108 provides an interface between system bus 104 and an I/O bus 110 to which one or more peripheral devices 114A through 114N (generically or collectively referred to as peripheral device(s) 114) as well as a general purpose I/O (GPIO) port are connected. Peripheral devices 114 may include devices such as a graphics adapter, a high-speed network adapter or network interface card (NIC), a hard-disk controller, and the like. I/O bus 110 is typically compliant with one of several industry standard I/O bus specifications including, as a common example, the Peripheral Components Interface (PCI) bus as specified in *PCI Local Bus Specification Rev* 2.2 by the PCI Special Interest Group (www.pcisig.com).

The depicted embodiment of server blade 100 includes a subsystem service processor 116 connected to GPIO port 112. Subsystem service processor 116 is configured to provide support for main processors 102. This support may include, for example, monitoring the power supplied to main processor(s) 102 and, in the event of a blade crash, initiating a restart of the main processors.

Figure 2A:
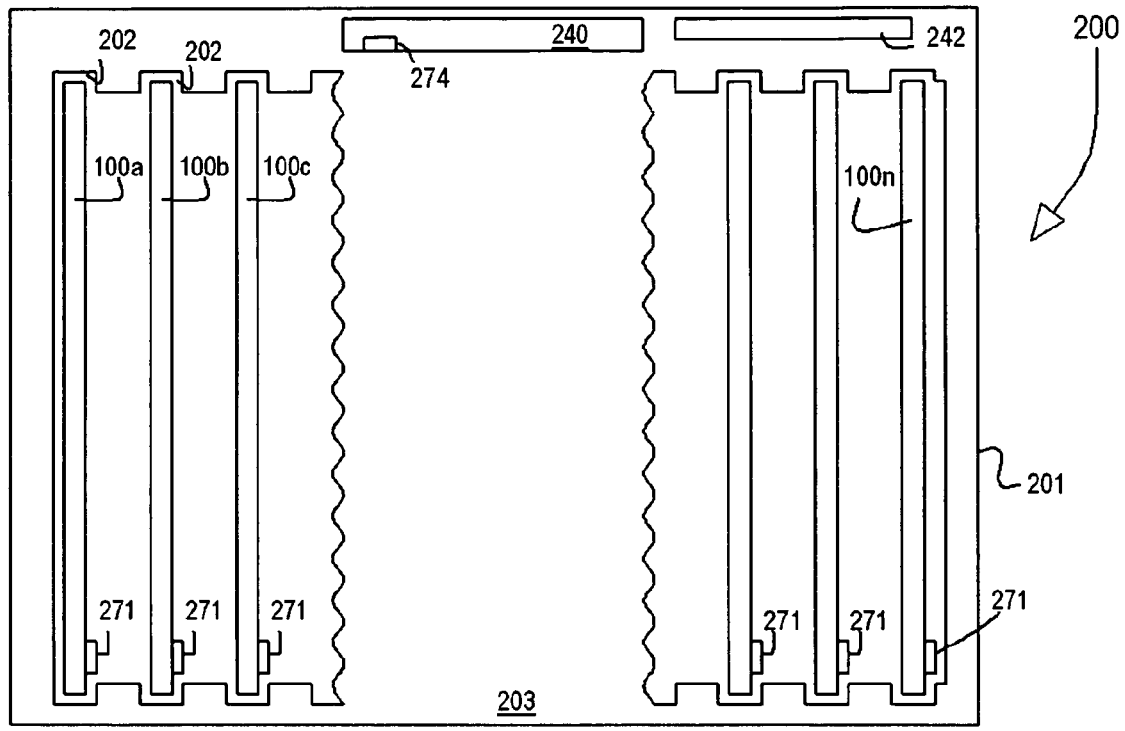
FIG. 2A is a front view of a data processing system according to the present invention.
Figure 2B:
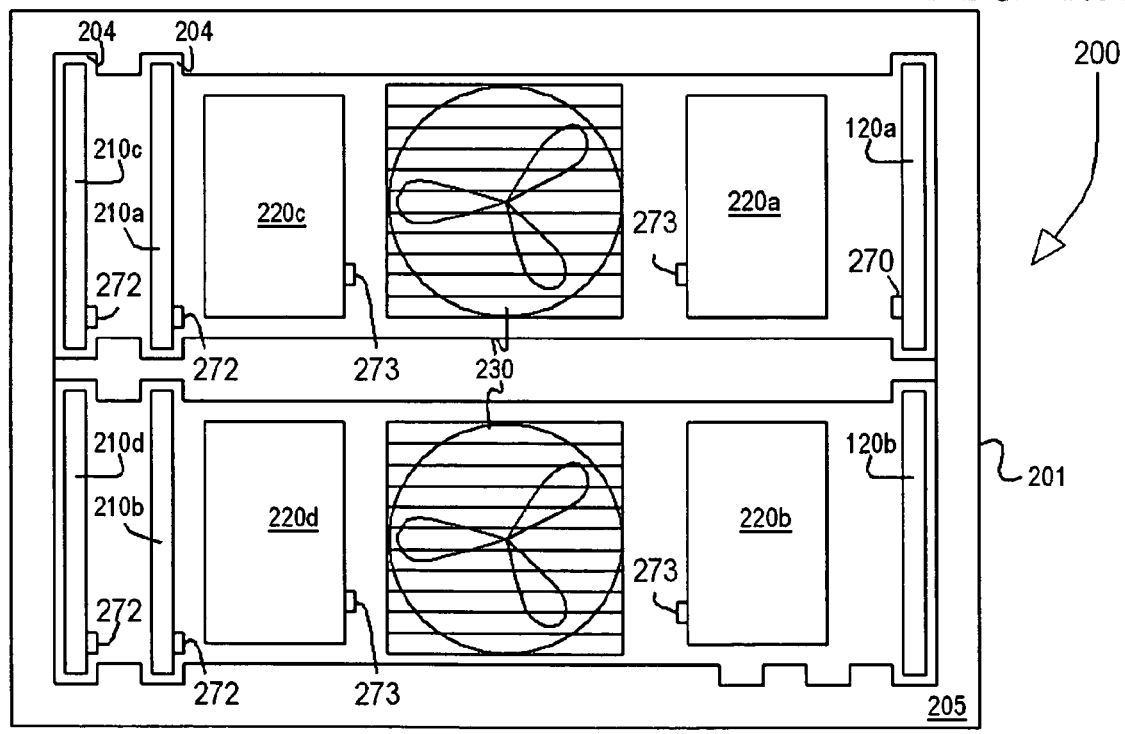
FIG. 2B is a rear view of the data processing system of FIG. 2A.

Turning now to FIGS. 2A and 2B, front and rear views respectively of an embodiment of a data processing system 200 are illustrated. As shown in the front view of FIG. 2A, data processing system 200 includes a cabinet (or chassis) 201 having a plurality of slots 202 in its front face 203. Each slot 202 is configured to receive a printed circuit board-based subsystem such as a server blade 100. (The set of server blades depicted in FIG. 2 are identified by reference numerals 100*a* through 100*n*). Each server blade 100 is plugged into an interconnection (not depicted) referred to herein as the mid-plane because of its intermediate location between server blades 100 and other adapters or blades that are plugged into the opposite side of the mid-plane from the rear face of cabinet 201 (see FIG. 2B). In this embodiment, the interconnected server blades 100 in system 200 are suitable for implementing a local area network (LAN) such as an Ethernet LAN in which each blade 100 has its own IP address and Media Access Control (MAC) address. Data processing system 200 may itself be connected to an external network such as the Internet through a gateway (not depicted) or other suitable network device. Because system 200 may include a plurality of server blades 100, system 200 may also be referred to herein as data processing assembly 200.

The number of server blades 100 within cabinet 201 varies with the implementation. In a representative implementation, front face 203 of cabinet 201 includes 14 or more slots 202 for receiving server blades 100. Each server blade 100 may be a full-height adapter.

Also shown in FIG. 2A is a media tray 240 and a diskette drive 242. Media tray 240 preferably includes a CD or DVD drive for installing software and performing other tasks with optical media. The rear view of assembly 200 depicted in FIG. 2B illustrates additional elements of an embodiment of assembly 200. Rear face 205 of cabinet 201 includes a set of half-height slots 204. Various half-height modules or blades are plugged into the previously mentioned mid-plane via slots 204 in rear face 205. In the depicted embodiment, these modules include a set of network interconnect modules identified by reference numerals 210*a*, 210*b*, 210*c*, and 210*d*, a set of power supply modules 220*a*, 220*b*, 220*c*, and 220*d*, and first and second system management modules 120*a* and 120*b* (generically or collectively referred to as management module(s) 120). Generally speaking, each management module 120 is configured to monitor and control resources and characteristics of subsystems in data processing assembly 200 that are shared by each server blade 100. These resources and characteristics may include, for example, the power applied to cabinet 201, cabinet cooling fans, and environmental characteristics such as the ambient temperature within cabinet 201. Also shown in FIG. 2B are a set of cabinet cooling fans 230.

It will be appreciated that the number of network interface modules 210, power supply modules 220, and cabinet-cooling fans 230 is implementation specific. Network interface modules 210 provide connectivity between the server blades 100 and an external network such as the Internet. In one embodiment, each server blade 100 is configured with four independent network connection paths via the four separate modules 210*a* through 210*d*. The power supply modules 220*a* and 220*b* provide assembly 200 with the required voltage levels.

As depicted in FIG. 2A and FIG. 2B, assembly 200 may be said to include a plurality of subsystems where a subsystem would include a server blade 100, an interconnect module 210, a power supply module 220, a fan 230, media tray 240, and so forth. In an embodiment suitable for use in a thermal modeling application according to the present invention, one or more of the assembly subsystems include thermal sensors. Thus, for example, server blades 100 are shown as including thermal sensors 271, interconnect modules are shown as including thermal sensors 272, power supply modules are shown as including thermal sensors 273, media tray 240 is shown as including a thermal sensor 274, and management module 120*a* is shown as including a thermal sensor 270. In one embodiment, the temperature reported by thermal sensor 274 on media tray 240 represents the inlet air temperature.

The thermal modeling described in the Thermal Analysis Application is applicable to a system analogous to assembly 200 and is based on various inputs and/or assumptions such as the inlet air temperature, the thermal characteristics of the subsystems, and the topology or physical arrangement of the configuration (e.g., are any server blade slots empty, etc.). In the Thermal Analysis Application, however, it was necessary to assume that the value used for inlet air temperature was accurate. From the presumably accurate inlet air temperature, the thermal modeling facilities generated predicted sets of values for each of the remaining thermals sensors in the systems for each of a variety of conditions. The system would then compare these predicted thermal sensor values against actual sensor values to select the most likely condition of the configuration.

The present invention beneficially extends the functionality of the Thermal Analysis Application by abandoning the assumption that the value of the inlet air temperature sensor, or the value of any other thermal sensor, is accurate. Instead, the thermal modeling facilities of the present invention generate predicted sensor values for various configuration states over a range of inlet air temperatures. When a set of actual sensor values is read, the thermal modeling facilities derive a figure of merit for each combination of configuration state and inlet air temperature. The figure of merit is indicative of the degree of similarity between a predicted set of sensor values and the actual set of sensor values. The thermal modeling facilities may then select the condition and inlet air temperature values that produce the lowest figure of merit (i.e., the highest degree of similarity).

Portions of the present invention may be implemented as a sequence of processor executable instructions (software), embedded in or stored on a computer readable medium, for detecting the thermal condition of assembly 200 and modeling the thermal characteristics of assembly 200 to predict the most likely cause of a detected condition. Portions of the software may reside in a volatile storage element such as the system memory 106 or an external or internal cache memory (not depicted) of processor(s) 130. At other times, portions of the software may be stored on a non-volatile storage medium such as a floppy diskette, hard disk, CD ROM, DVD, magnetic tape, or other suitable storage medium. In addition, portions of the software may be executed by management module 120 while other portions are executed by subsystem service processors 116 of each server blade 100. Still other portions of the software may be executed by one or more main processors 102.

Turning momentarily to FIG. 5, a conceptual representation of a table 500 of figure of merit values determined according to the present invention for a given topology of assembly 200 depicted in FIG. 2A and FIG. 2B is shown. The depicted embodiment of table 500 includes a set of rows 501-1 through 501-N where each row 501 corresponds to a particular configuration state or failure scenario. For example, row 501-1 corresponds to a nominal operation configuration state while row 501-2 corresponds to a configuration state in which a first intake of the system is blocked. For each row 501, table 500 includes a set of figure of merit values 502-1 through 502-M where each figure of merit corresponds to a different inlet air temperature. The range of inlet temperature values over which the invention determines a figure of merit is an implementation detail, but generally extends over a range of approximately 20 C to 40 C.

Figure 3:
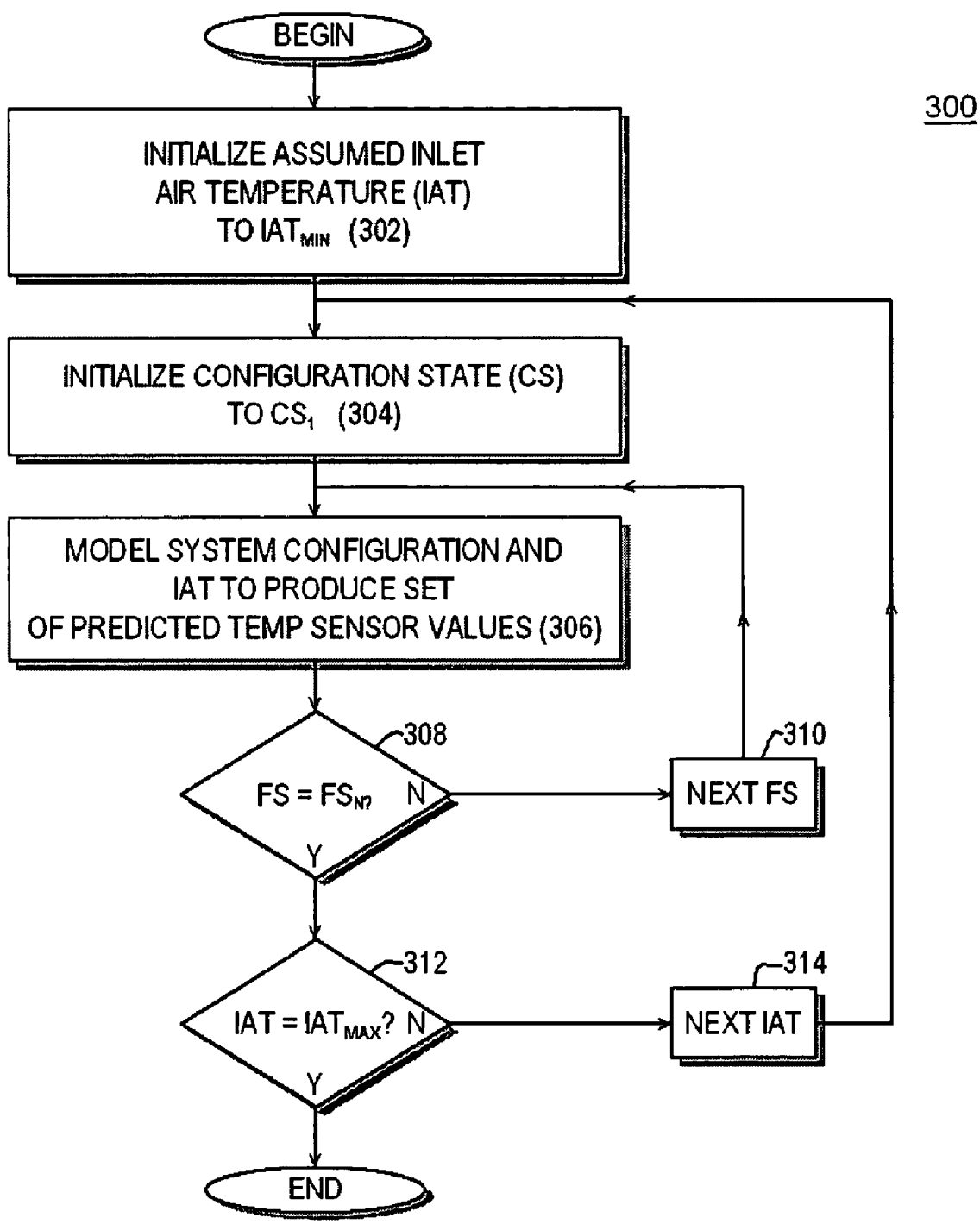
FIG. 3 is a flow diagram of a method of generating information predicting thermal sensor readings for various system configuration states and various inlet air temperature values.

Referring now to FIG. 3, a method 300 of generating predicted values for the thermal sensors in system 200 according to one embodiment of the invention is depicted as a flow diagram. Generally, method 300 is suitable for generating predicted values for the various thermal sensors of system 200 across a range of inlet air temperatures. For each inlet air temperature in the range of inlet air temperatures, method 300 invokes a thermal model of system 200 to generate one or more sets of predicted thermal sensor values. In the embodiment depicted in FIG. 3, for example, method 300 generates a set of predicted thermal sensor values for each of a plurality of configuration states and a plurality of inlet air temperatures.

Specifically, method 300 includes initializing (block 302) a variable referred to as the assumed inlet air temperature (IAT). As implied by its name, the assumed IAT recognizes that the actual IAT may not be known or knowable because, for example, a sensor intended to indicate the IAT is malfunctioning. Whereas prior efforts regarding thermal analysis have taken the IAT reported by an IAT sensor as a given quantity, the present invention treats the IAT sensor value as another variable to be considered in determining the most likely thermal state of assembly 200.

In the depicted embodiment, method 300 produces predicted thermal sensor values for a number of failure scenarios or configuration states (across a range of IAT's). The various configuration states for which model 300 generates predicted thermal sensor values are denoted as $CS_1$ through $CS_N$. Method 300 includes initializing (block 304) the configuration state to $CS_1$. Examples of the types of configuration states that method 300 is suitable for modeling are reflected in the configuration states represented by the different rows 501 of FIG. 5.

Having initialized the IAT and the configuration state, method 300 then invokes a thermal analysis model such as the model disclosed in the Thermal Analysis Application to produce (block 306) a set of predicted thermal sensor values corresponding to configuration state. As used in conjunction with assembly 200, the configuration state includes both the system's topological configuration (e.g., the number and locations of server blades and other adapter boards within assembly 200) and any faulty conditions that exist within that configuration. For example, a configuration state of assembly 200 may include 10 server blades inserted in the first ten slots 202 and four "blank" panel inserts in the remaining slots 202 as well as any faulty conditions such as a blocked intake, a missing cover panel, an overheating subsystem, a faulty thermal sensor, etc.

As reflected in blocks 308, 310, 312, and 314, method 300 includes performing thermal analysis for each combination of configuration state and assumed IAT. In this manner, method 300 produces multiple sets of predicted thermal sensor values. Each set preferably includes a predicted value for each thermal sensor 270-273 in the system. In the depicted embodiment, a set of predicted values is produced for every combination of IAT and configuration state.

Figure 4:
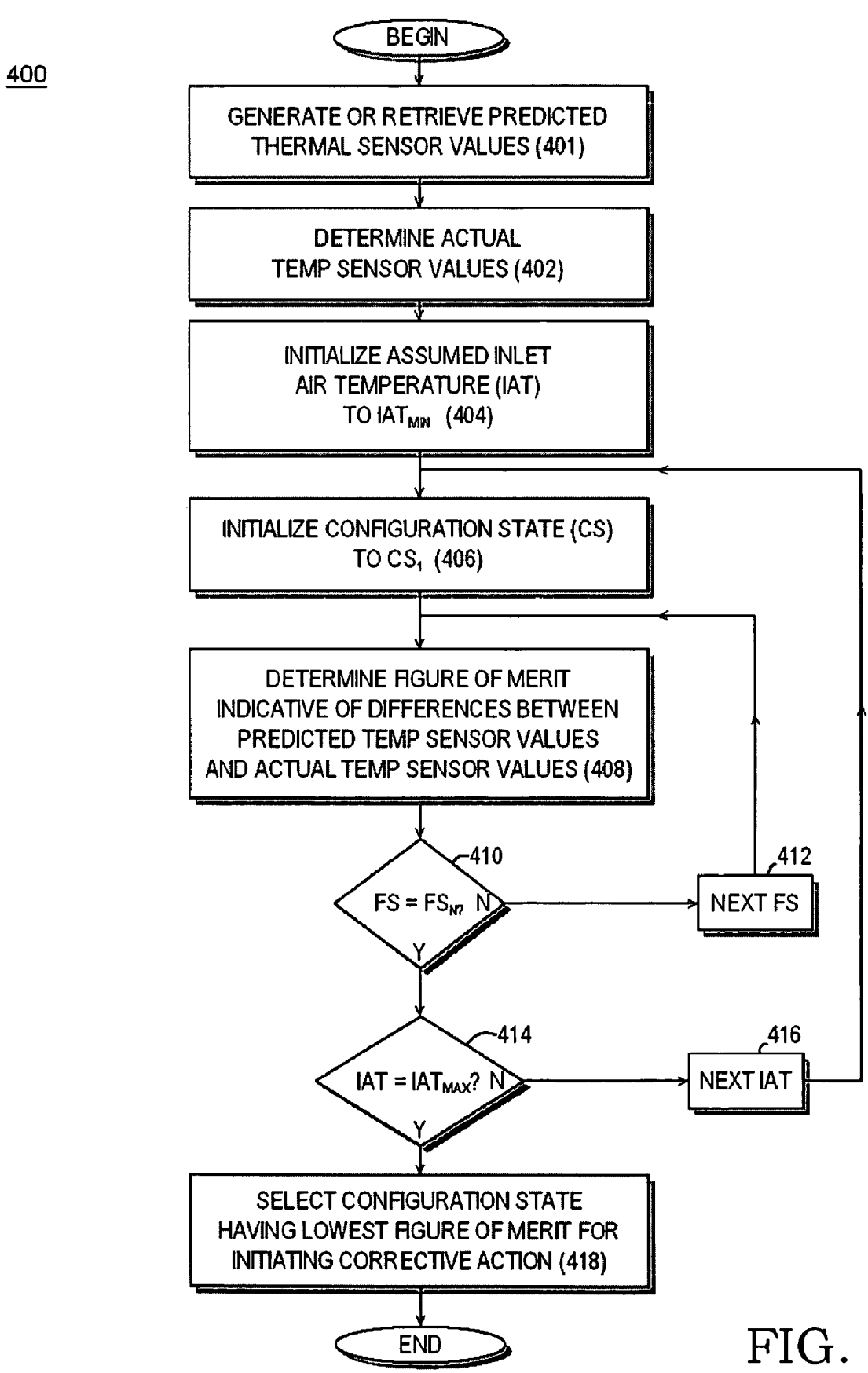
FIG. 4 is a flow diagram of a method of identifying a likely configuration state using the predicted thermal readings predicted by the method of FIG. 3 in conjunction with actual readings from the thermal sensor according to the present invention.

Referring now to FIG. 4, a flowchart depicting a method of identifying a most likely configuration state for purposes of determining corrective action in response to a thermal warning or thermal failure is depicted. In the depicted embodiment, method 400 includes an initial block 401 in which the sets of predicted thermal sensor values are either retrieved or produced using, for example, method 300 as depicted in FIG. 3. In the preferred embodiment, the sets of predicted thermal sensor values will have been previously generated and saved in storage of assembly 200 so that it is not necessary to invoke method 300 of FIG. 3 each time method 400 is invoked.

Following the generation or retrieval of predicted thermal sensor values in block 401, the actual sensor values are determined in block 402. The actual sensor values are preferably determined by reading the current values of each thermal sensor 270 through 273 of FIG. 1. The present invention makes no assumption about the correctness or accuracy of the thermal sensor values read in block 402. Instead, the present invention treats the thermal sensor values as variables that may or may not reflect a thermal problem with the system.

Referring back to FIG. 5, the configuration states 501-1 through 501-N include configuration states in which individual thermal sensors are malfunctioning. For example, table 500 includes a configuration state (row 501-K) corresponding to a specific thermal sensor (referred to as $T_1$) indicating a value that is 2 C higher than the actual value. Configuration states such as this one may be repeated for each thermal sensor and for a variety of malfunction thermal sensor conditions (e.g., reading high by 2, 4, 6, 8 . . . C and reading low by 2, 4, 6, 8, etc.). By eliminating assumptions about the correctness of any individual thermal sensors, the present invention beneficially expands the functionality of the thermal analysis model by taking into consideration failures or malfunctioning conditions for the thermal analysis elements themselves.

Following the determination of the thermal sensor value in block 402, method 400 includes an iterative loop (similar to the loop of method 300 of FIG. 3) in which the method performs an action iteratively across a set of configuration states and a set of IAT's. More specifically, method 400 includes initializing (block 404) the IAT to $IAT_{MIN}$ and initializing (block 406) the configuration state to the first configuration state (arbitrarily designated as $CS_1$).

After the initialization of an IAT and configuration state is complete, method 400 includes determining (block 408) a figure of merit for the IAT/configuration state combination. The figure of merit is indicative of extent of differences between the actual sensor values determined in block 402 and the predicted values retrieved or generated in block 401. In one embodiment, the figure of merit is determined by taking a sum of squares of the differences (sometimes referred to as a least squares) between the predicted sensor values and the predicted values. Other embodiments, however, may employ alternative methodologies for determining which predicted set of thermal sensor values most closely matches the set of actual sensor values. In embodiments using a sum of squares method or other similar methods, the difference between a set of predicted sensor values and the actual sensor values are distilled into a single numerical value, referred to as the figure of merit.

As reflected in blocks 410, 412, 414, and 416, method 400 performs the block 406 determination of a figure of merit for every combination of configuration state and thermal sensor value 402. The process of generating figures of merit for each combination of configuration state and IAT results in the creation of table 500. Method 400 then includes a block 418 during which the configuration state having the lowest figure of merit is selected for purposes of determining what, if any, corrective action to be taken by the system. Corrective actions may include actions such as logging information regarding the configuration state, alerting a system administrator, shutting down one or more subsystems, and shutting down the entire system depending upon the nature of the determined configuration state. A significant benefit of the present invention is that the corrective action is more likely to be the most appropriate corrective action because the configuration state having the lowest figure of merit is likely to be the actual configuration state of the system.

It will be apparent to those skilled in the art having the benefit of this disclosure that the present invention contemplates a method of modeling the thermal behavior of a data processing system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of operating a data processing system having a plurality of sensors, comprising:
    predicting a set of values for the plurality of sensors corresponding to an assumed ambient condition and a selected configuration state, wherein the plurality of sensors includes an inlet air temperature sensor suitable for determining air temperature at an inlet to the data processing system;
    repeating said predicting for a plurality of assumed ambient conditions and a plurality of configuration states to generate a plurality of sets of predicted values;
    determining a set of actual values of said sensors;
    determining information indicative of differences between each set of predicted values and the set of actual values; and
    identifying a most likely configuration state and actual ambient condition based on the determined information.

2. The method of claim 1, wherein the plurality of configuration states include a configuration state in which one of the sensors is malfunctioning.

3. The method of claim 2, wherein the malfunctioning sensor reports a temperature value that differs from the actual temperature, and wherein the difference between the temperature reported by the malfunctioning sensor and the actual is relatively constant.

4. The method of claim 3, wherein determining the information comprising determining a figure of merit for each of the sets of predicted values, wherein each figure of merit is determined by squaring a difference between each of the actual sensor values and a corresponding predicted sensor value and summing the squares.

5. The method of claim 4, wherein identifying the most likely configuration state comprises selecting the configuration state having the lowest figure of merit.

6. The method of claim 1, further comprising, initiating corrective action responsive to said identifying the most likely configuration state.

7. A data processing system having a plurality of thermal sensors, comprising:
    a plurality of interconnected server blades within a chassis, the plurality of interconnected server blades coupled to a management module, the management module including a management processor;
    management processor means for predicting a set of values for the plurality of thermal sensors corresponding to an assumed inlet air temperature and a selected configuration state, wherein the plurality of thermal sensors includes an inlet air temperature thermal sensor suitable for determining air temperature at an inlet to the data processing system;
    management processor means for repeating said predicting for a plurality of assumed inlet air temperatures and a plurality of configuration states to generate a plurality of sets of predicted values;
    management processor means for determining a set of actual values of said thermal sensors;
    management processor means for determining information indicative of differences between each set of predicted values and the set of actual values; and
    management processor means for identifying a most likely configuration state based on the determined information.

8. The data processing system of claim 7, wherein the plurality of configuration states include a configuration state in which one of the thermal sensors is malfunctioning.

9. The data processing system of claim 8, wherein the malfunctioning thermal sensor reports a temperature value that differs from the actual temperature, and wherein the difference between the temperature reported by the malfunctioning thermal sensor and the actual is relatively constant.

10. The data processing system of claim 9, wherein determining the information comprising determining a figure of merit for each of the sets of predicted values, wherein each figure of merit is determined by squaring a difference between each of the actual thermal sensor values and a corresponding predicted thermal sensor value and summing the squares.

11. The data processing system of claim 10, wherein identifying the most likely configuration state comprises selecting the configuration state having the lowest figure of merit.

12. The data processing system of claim 7, further comprising, initiating corrective action responsive to said identifying the most likely configuration state.

13. A computer program product comprising computer executable instructions, stored on a computer readable medium, for operating a data processing system having a plurality of thermal sensors, comprising:
    instructions for predicting a set of values for the plurality of thermal sensors corresponding to an assumed inlet air temperature and a selected configuration state, wherein the plurality of thermal sensors includes an inlet air temperature thermal sensor suitable for determining air temperature at an inlet to the data processing system;
    instructions for repeating said predicting for a plurality of assumed inlet air temperatures and a plurality of configuration states to generate a plurality of sets of predicted values;
    instructions for determining a set of actual values of said thermal sensors;

instructions for determining information indicative of differences between each set of predicted values and the set of actual values; and instructions for identifying a most likely configuration state based on the determined information.

14. The computer program product of claim 13, wherein the plurality of configuration states include a configuration state in which one of the thermal sensors is malfunctioning.

15. The computer program product of claim 14, wherein the malfunctioning thermal sensor reports a temperature value that differs from the actual temperature, and wherein the difference between the temperature reported by the malfunctioning thermal sensor and the actual is relatively constant.

16. The computer program product of claim 15, wherein determining the information comprising determining a figure of merit for each of the sets of predicted values, wherein each figure of merit is determined by squaring a difference between each of the actual thermal sensor values and a corresponding predicted thermal sensor value and summing the squares and wherein identifying the most likely configuration state comprises selecting the configuration state having the lowest figure of merit.

17. The computer program product of claim 13, further comprising, initiating corrective action responsive to said identifying the most likely configuration state.

* * * * *